United States Patent
Nakamura et al.

(10) Patent No.: US 10,302,994 B2
(45) Date of Patent: May 28, 2019

(54) OPTICAL MEMBER

(71) Applicant: NITTO DENKO CORPORATION, Ibaraki-shi, Osaka (JP)

(72) Inventors: Kozo Nakamura, Ibaraki (JP); Daisuke Hattori, Ibaraki (JP); Kazuhito Hosokawa, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 15/679,436

(22) Filed: Aug. 17, 2017

(65) Prior Publication Data

US 2018/0067360 A1    Mar. 8, 2018

(30) Foreign Application Priority Data

Sep. 2, 2016    (JP) .................. 2016-171604

(51) Int. Cl.
| | |
|---|---|
| *G02B 5/30* | (2006.01) |
| *G02F 1/1335* | (2006.01) |
| *G02B 5/02* | (2006.01) |
| *G02B 5/04* | (2006.01) |
| *G02F 1/13363* | (2006.01) |

(52) U.S. Cl.
CPC ..... *G02F 1/133536* (2013.01); *G02B 5/0242* (2013.01); *G02B 5/045* (2013.01); *G02B 5/305* (2013.01); *G02B 5/3025* (2013.01); *G02B 5/3083* (2013.01); *G02F 1/13363* (2013.01); *G02F 2001/133567* (2013.01);
(Continued)

(58) Field of Classification Search
CPC .... G02B 5/0205; G02B 5/0242; G02B 5/045; G02B 5/3025; G02B 5/305; G02F 5/3083; G02F 1/133536; G02F 1/13363

USPC ........... 359/485.01, 487.02, 489.07, 489.08, 359/489.11, 489.12, 599
See application file for complete search history.

(56) References Cited

U.S. PATENT DOCUMENTS

| | | | |
|---|---|---|---|
| 5,828,488 A | 10/1998 | Ouderkirk et al. | |
| 5,882,774 A | 3/1999 | Jonza et al. | |

(Continued)

FOREIGN PATENT DOCUMENTS

| | | |
|---|---|---|
| JP | 9-506984 A | 7/1997 |
| JP | 11-295714 A | 10/1999 |

(Continued)

OTHER PUBLICATIONS

U.S. Appl. No. 15/682,805, filed Oct. 25, 2017.
(Continued)

*Primary Examiner* — Ricky D Shafer
(74) *Attorney, Agent, or Firm* — Westerman, Hattori, Daniels & Adrian, LLP

(57) ABSTRACT

There is provided an optical member capable of causing, when used for a liquid crystal display apparatus, light output from a light source to enter a liquid crystal display panel with high efficiency. An optical member according to an embodiment of the present invention includes: a polarizing plate; a reflective polarizer; a polarization converting layer; and a prism layer, the polarizing plate, the reflective polarizer, the polarization converting layer, and the prism layer being integrated in the stated order, wherein the polarization converting layer satisfies the following expression: $L_{90}/L_0 \geq 0.2$.

6 Claims, 4 Drawing Sheets

(52) U.S. Cl.
CPC ............ *G02F 2001/133638* (2013.01); *G02F 2413/01* (2013.01); *G02F 2413/05* (2013.01)

(56) References Cited

U.S. PATENT DOCUMENTS

| | | |
|---|---|---|
| 5,962,114 A | 10/1999 | Jonza et al. |
| 5,965,247 A | 10/1999 | Jonza et al. |
| 6,025,897 A | 2/2000 | Weber et al. |
| 6,045,894 A | 4/2000 | Jonza et al. |
| 6,096,375 A | 8/2000 | Ouderkirk et al. |
| 6,117,530 A | 9/2000 | Jonza et al. |
| 6,124,971 A | 9/2000 | Ouderkirk et al. |
| 6,262,842 B1 | 7/2001 | Ouderkirk et al. |
| 6,296,927 B1 | 10/2001 | Jonza et al. |
| 6,486,997 B1 | 11/2002 | Bruzzone et al. |
| 6,498,683 B2 | 12/2002 | Condo et al. |
| 6,531,230 B1 | 3/2003 | Weber et al. |
| 6,543,153 B1 | 4/2003 | Weber et al. |
| 6,565,974 B1 | 5/2003 | Uchiyama et al. |
| 6,613,421 B2 | 9/2003 | Jonza et al. |
| 6,635,337 B2 | 10/2003 | Jonza et al. |
| 6,721,096 B2 | 4/2004 | Bruzzone et al. |
| 6,744,561 B2 | 6/2004 | Condo et al. |
| 6,788,463 B2 | 9/2004 | Merrill et al. |
| 6,797,366 B2 | 9/2004 | Hanson et al. |
| 6,804,058 B1 | 10/2004 | Ouderkirk et al. |
| 6,888,675 B2 | 5/2005 | Ouderkirk et al. |
| 6,888,677 B2 | 5/2005 | Condo et al. |
| 7,023,602 B2 | 4/2006 | Aastuen et al. |
| 7,038,745 B2 | 5/2006 | Weber et al. |
| 7,083,847 B2 | 8/2006 | Jonza et al. |
| 7,133,091 B2 | 11/2006 | Ohsumi |
| 7,138,173 B2 | 11/2006 | Wheatley et al. |
| 7,141,297 B2 | 11/2006 | Condo et al. |
| 7,297,393 B2 | 11/2007 | Jonza et al. |
| 7,321,464 B2 | 1/2008 | Ouderkirk et al. |
| 7,423,708 B2 | 9/2008 | Weber et al. |
| 7,652,820 B2 | 1/2010 | Aastuen et al. |
| 7,851,054 B2 | 12/2010 | Weber et al. |
| 7,852,560 B2 | 12/2010 | Ouderkirk et al. |
| 9,261,640 B2 | 2/2016 | Koike et al. |
| 9,261,731 B2 | 2/2016 | Koike et al. |
| 9,588,270 B2 | 3/2017 | Merrill et al. |
| 10,001,669 B2 * | 6/2018 | Fuchida ................. G02B 1/105 |
| 2001/0008464 A1 | 7/2001 | Ouderkirk et al. |
| 2002/0031676 A1 | 3/2002 | Jonza et al. |
| 2002/0039235 A1 | 4/2002 | Condo et al. |
| 2002/0061393 A1 | 5/2002 | Jonza et al. |
| 2002/0109795 A1 | 8/2002 | Bruzzone et al. |
| 2002/0154406 A1 | 10/2002 | Merrill et al. |
| 2003/0035972 A1 | 2/2003 | Hanson et al. |
| 2003/0053215 A1 | 3/2003 | Condo et al. |
| 2003/0156233 A1 | 8/2003 | Ohsumi |
| 2003/0164914 A1 | 9/2003 | Weber et al. |
| 2003/0184864 A1 | 10/2003 | Bruzzone et al. |
| 2004/0043205 A1 | 3/2004 | Jonza et al. |
| 2004/0085642 A1 | 5/2004 | Condo et al. |
| 2004/0125430 A1 | 7/2004 | Kasajima et al. |
| 2005/0019530 A1 | 1/2005 | Merrill et al. |
| 2005/0024726 A1 | 2/2005 | Ouderkirk et al. |
| 2005/0079333 A1 | 4/2005 | Wheatley et al. |
| 2005/0122587 A1 | 6/2005 | Ouderkirk et al. |
| 2005/0186408 A1 | 8/2005 | Condo et al. |
| 2005/0270439 A1 | 12/2005 | Weber et al. |
| 2006/0098284 A1 | 5/2006 | Aastuen et al. |
| 2006/0262400 A1 | 11/2006 | Ouderkirk et al. |
| 2006/0286396 A1 | 12/2006 | Jonza |
| 2007/0091230 A1 | 4/2007 | Ouderkirk et al. |
| 2007/0121034 A1 | 5/2007 | Ouderkirk et al. |
| 2007/0184274 A1 | 8/2007 | Wheatley et al. |
| 2009/0079909 A1 | 3/2009 | Ouderkirk et al. |
| 2009/0155540 A1 | 6/2009 | Merrill et al. |
| 2009/0219620 A1 | 9/2009 | Yamada et al. |
| 2009/0323180 A1 | 12/2009 | Weber et al. |
| 2012/0105957 A1 | 5/2012 | Merrill et al. |
| 2013/0083276 A1 | 4/2013 | Iwahashi et al. |
| 2015/0009451 A1 | 1/2015 | Zhu et al. |
| 2015/0029442 A1 | 1/2015 | Koike et al. |
| 2015/0036215 A1 | 2/2015 | Uchida et al. |
| 2015/0226999 A1 * | 8/2015 | Fuchida ............ G02F 1/133606 349/96 |
| 2015/0234106 A1 * | 8/2015 | Nakamura ........ G02F 1/133536 349/96 |
| 2015/0277012 A1 * | 10/2015 | Nakamura ............. G02B 5/045 349/96 |
| 2015/0301384 A1 | 10/2015 | Koike et al. |
| 2016/0003998 A1 | 1/2016 | Benoit et al. |
| 2016/0131927 A1 * | 5/2016 | Maesawa .......... G02F 1/133524 349/57 |
| 2018/0067250 A1 * | 3/2018 | Nakamura .......... G02B 5/3041 |

FOREIGN PATENT DOCUMENTS

| | | |
|---|---|---|
| JP | 2013-3258 A | 1/2013 |
| JP | 2013-190778 A | 9/2013 |
| JP | 2013-190779 A | 9/2013 |
| WO | 2014123836 A1 | 8/2014 |

OTHER PUBLICATIONS

Office Action dated Apr. 6, 2018, issued in co-pending U.S. Appl. No. 15/682,805 (in English: 20 pages; w/ PTO-892 and returned PTO/SB/08a).

Office Action dated Nov. 26, 2018, issued in co-pending U.S. Appl. No. 15/682,805 (in English; 17 pages; w/ PTO-892).

* cited by examiner

OPTICAL MEMBER

BACKGROUND OF THE INVENTION

This application claims priority under 35 U.S.C Section 119 to Japanese Patent Application No. 2016-171604 filed on Sep. 2, 2016 which are herein incorporated by reference.

1. Field of the Invention

The present invention relates to an optical member.

2. Description of the Related Art

In recent years, as a display, a liquid crystal display apparatus using a surface light source device has been remarkably widespread. In a liquid crystal display apparatus including an edge light-type surface light source device, for example, light emitted from a light source enters a light guide plate, and propagates through an inside of the light guide plate while repeating total reflection on a light output surface (liquid crystal cell-side surface) of the light guide plate and a back surface thereof. Part of the light that propagates through the inside of the light guide plate allows a traveling direction thereof to be changed by a light scattering body or the like, which is arranged on the back surface of the light guide plate or the like, and is output from the light output surface to an outside of the light guide plate. Such light output from the light output surface of the light guide plate is diffused and condensed by various optical sheets, such as a diffusing sheet, a prism sheet, and a luminance enhancement film, and thereafter, the light enters a liquid crystal display panel in which polarizing plates are arranged on both sides of a liquid crystal cell. Liquid crystal molecules of a liquid crystal layer of the liquid crystal cell are driven for each of pixels to control transmission and absorption of the incident light. As a result, an image is displayed.

Typically, the above-mentioned prism sheet is fitted into a casing of the surface light source device, and is arranged close to the light output surface of the light guide plate. In a liquid crystal display apparatus using such a surface light source device as described above, the prism sheet and the light guide plate are rubbed against each other when installing the prism sheet or under an actual usage environment, and the light guide plate is flawed in some cases. In order to solve such a problem, a technology for integrating the prism sheet with a light source-side polarizing plate is proposed (Japanese Patent Application Laid-open No. Hei 11-295714).

SUMMARY OF THE INVENTION

However, a liquid crystal display apparatus using the polarizing plate integrated with the prism sheet as described above has a problem of being dark because of its insufficient front luminance. The present invention has been made in view of the problem, and an object of the present invention is to provide an optical member capable of causing, when used for a liquid crystal display apparatus, light output from a light source to enter a liquid crystal display panel with high efficiency.

An optical member according to an embodiment of the present invention includes: a polarizing plate; a reflective polarizer; a polarization converting layer; and a prism layer, the polarizing plate, the reflective polarizer, the polarization converting layer, and the prism layer being integrated in the stated order, wherein the polarization converting layer satisfies the following expression: $L_{90}/L_{0} \geq 0.2$ where, with regard to a luminance of natural light transmitted through a first polarizer and a second polarizer each having a polarization degree of 99.99%, $L_{0}$ represents a parallel luminance, which is the luminance when the polarization converting layer is arranged between the first polarizer and the second polarizer arranged so that absorption axes thereof are parallel to each other, and $L_{90}$ represents a perpendicular luminance, which is the luminance when the polarization converting layer is arranged between the first polarizer and the second polarizer arranged so that the absorption axes thereof are perpendicular to each other.

In one embodiment of the present invention, the polarization converting layer includes a retardation layer, and the retardation layer has an in-plane retardation Re(550) of 3,500 nm or more, where Re(550) represents an in-plane retardation measured with light having a wavelength of 550 nm at 23° C.

In one embodiment of the present invention, the polarization converting layer includes a light diffusing layer, and the light diffusing layer has a haze value of from 80% to 99.9%.

In one embodiment of the present invention, the polarization converting layer includes a λ/4 plate, wherein the λ/4 plate has an in-plane retardation Re(550) of from 80 nm to 200 nm, and an angle formed between a slow axis of the λ/4 plate and a reflection axis of the reflective polarizer is from 30° to 60°.

In one embodiment of the present invention, the optical member further includes a low-refractive index layer integrated at one of a position between the reflective polarizer and the prism layer, and a position on an opposite side of the reflective polarizer to the prism layer, wherein the low-refractive index layer has a refractive index of 1.30 or less.

In one embodiment of the present invention, the reflective polarizer includes a linearly polarized light separation-type reflective polarizer.

According to the present invention, the optical member capable of causing light output from a light source to enter a liquid crystal display panel with high efficiency can be provided.

DESCRIPTION OF THE EMBODIMENTS

Figure 1:
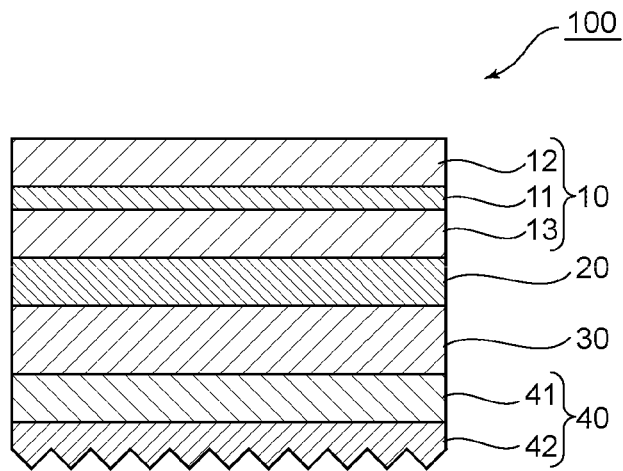
FIG. 1 is a cross-sectional view of an optical member according to one embodiment of the present invention.

Embodiments of the present invention are described below. However, the present invention is not limited to these embodiments.

Definitions of Terms and Symbols

The definitions of terms and symbols used herein are as follows.

(1) Refractive Indices (nx, ny, and nz)

A symbol "nx" represents a refractive index in a direction in which an in-plane refractive index is maximum (that is, slow axis direction), "ny" represents a refractive index in a direction perpendicular to the slow axis in the plane (that is, fast axis direction), and "nz" represents a refractive index in a thickness direction.

(2) In-Plane Retardation (Re)

The term "Re(λ)" refers to the in-plane retardation of a film measured at 23° C. with light having a wavelength of λ nm. The Re(λ) is determined from the equation "Re(λ)=(nx−ny)×d" when the thickness of the film is represented by d (nm). For example, the term "Re(550)" refers to the in-plane retardation of the film measured at 23° C. with light having a wavelength of 550 nm.

(3) Thickness Direction Retardation (Rth)

The term "Rth(λ)" refers to the thickness direction retardation of the film measured at 23° C. with light having a wavelength of λ nm. For example, the term "Rth(550)" refers to the thickness direction retardation of the film measured at 23° C. with light having a wavelength of 550 nm. The Rth(λ) is determined from the equation "Rth(λ)=(nx−nz)×d" when the thickness of the film is represented by d (nm).

(4) Nz Coefficient

An Nz coefficient is determined from the equation "Nz=Rth/Re".

A. Entire Configuration of Optical Member

An optical member includes a polarizing plate 10, a reflective polarizer 20, a polarization converting layer 30, and a prism sheet 40 in the stated order, in which the polarizing plate 10, the reflective polarizer 20, the polarization converting layer 30, and the prism sheet 40 are integrated. The prism sheet 40 typically includes a substrate portion 41 and a prism portion 42 (prism layer).

The polarization converting layer 30 is configured to convert (or depolarize) the polarization state of light entering from the prism sheet 40 side and output the light to the reflective polarizer 20 side. The polarization converting layer 30 has a polarization conversion degree $P_{CON}$, which is expressed by the following equation, of 0.2 or more:

Polarization conversion degree $(P_{CON}) = L_{90}/L_0$ where, with regard to the luminance of natural light of visible light transmitted through a first polarizer and a second polarizer each having a polarization degree of 99.99%, $L_0$ (parallel luminance) represents the luminance when the polarization converting layer is arranged between the first polarizer and the second polarizer arranged so that the absorption axes thereof are parallel to each other, and $L_{90}$ (perpendicular luminance) represents the luminance when the polarization converting layer is arranged between the first polarizer and the second polarizer arranged so that the absorption axes thereof are perpendicular to each other. According to the above-mentioned configuration, when the optical member is arranged between a polarizing plate on the opposite side of a liquid crystal display panel to a viewer side and a backlight unit, light output from the backlight unit and having its polarization state converted (or depolarized) by the polarization converting layer 30 enters the reflective polarizer 20. With this, the utilization efficiency of the light output from the backlight unit can be enhanced.

The optical member may include any of various optical sheets in addition to the polarizing plate 10, the reflective polarizer 20, the polarization converting layer 30, and the prism sheet 40.

Figure 2:
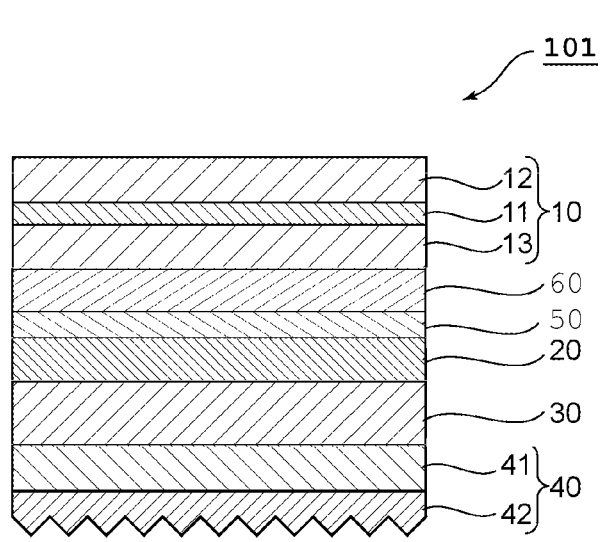
FIG. 2 is a cross-sectional view of an optical member according to another embodiment of the present invention.
Figure 3:
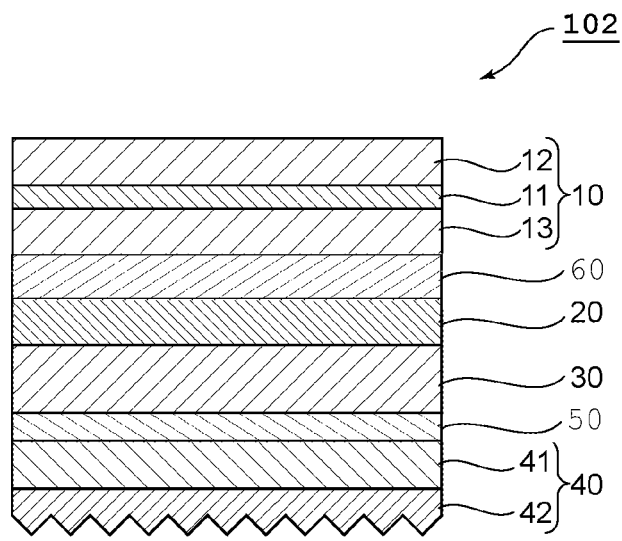
FIG. 3 is a cross-sectional view of an optical member according to still another embodiment of the present invention.
Figure 4:
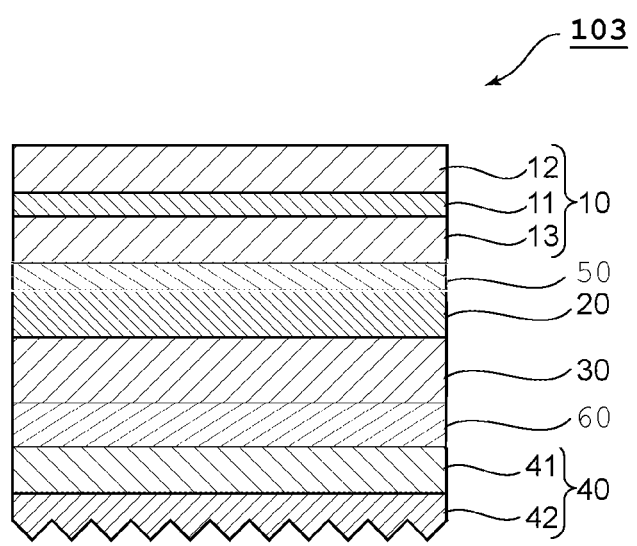
FIG. 4 is a cross-sectional view of an optical member according to yet still another embodiment of the present invention.
Figure 5:
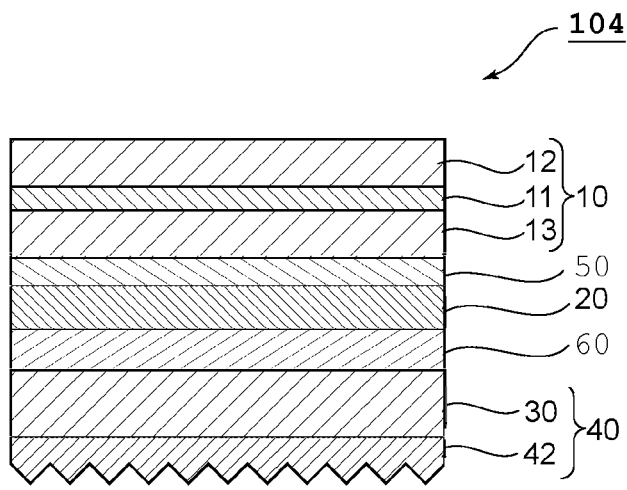
FIG. 5 is a cross-sectional view of an optical member according to even yet still another embodiment of the present invention.

FIG. 1 is a cross-sectional view of an optical member 100 according to one embodiment of the present invention. FIG. 2 is a cross-sectional view of an optical member according to another embodiment of the present invention. An optical member 101 illustrated in FIG. 2 includes the polarizing plate 10, a low-refractive index layer 60, a light diffusing layer 50, the reflective polarizer 20, the polarization converting layer 30, and the prism sheet 40 in the stated order. FIG. 3 is a cross-sectional view of an optical member according to still another embodiment of the present invention. An optical member 102 illustrated in FIG. 3 includes the polarizing plate 10, the low-refractive index layer 60, the reflective polarizer 20, the polarization converting layer 30, the light diffusing layer 50, and the prism sheet 40 in the stated order. FIG. 4 is a cross-sectional view of an optical member according to yet still another embodiment of the present invention. An optical member 103 illustrated in FIG. 4 includes the polarizing plate 10, the light diffusing layer 50, the reflective polarizer 20, the polarization converting layer 30, the low-refractive index layer 60, and the prism sheet 40 in the stated order. FIG. 5 is a cross-sectional view of an optical member according to even yet still another embodiment of the present invention. An optical member 104 illustrated in FIG. 5 includes the polarizing plate 10, the light diffusing layer 50, the reflective polarizer 20, the low-refractive index layer 60, and the prism sheet 40 in the stated order, in which the prism sheet 40 includes the polarization converting layer 30 configured to function as the substrate portion, and the prism portion 42 (prism layer). Two or more of the above-mentioned embodiments may be combined.

B. Polarizing Plate

The polarizing plate 10 typically includes a polarizer 11, a protective layer 12 arranged on one side of the polarizer 11, and a protective layer 13 arranged on the other side of the polarizer 11. The polarizer is typically an absorption-type polarizer.

B-1. Polarizer

Any appropriate polarizer may be adopted as the absorption-type polarizer depending on purposes. For example, a resin film for forming the polarizer may be a single-layer resin film, or may be a laminate of two or more layers.

Specific examples of the polarizer including a single-layer resin film include: a polarizer obtained by subjecting a hydrophilic polymer film, such as a polyvinyl alcohol (PVA)-based film, a partially formalized PVA-based film, or an ethylene-vinyl acetate copolymer-based partially saponified film, to dyeing treatment with a dichromatic substance, such as iodine or a dichromatic dye, and stretching treatment; and a polyene-based alignment film, such as a dehydration-treated product of PVA or a dehydrochlorination-treated product of polyvinyl chloride. A polarizer obtained by dyeing the PVA-based film with iodine and uniaxially stretching the resultant is preferably used because the polarizer is excellent in optical characteristics.

The dyeing with iodine is performed by, for example, immersing the PVA-based film in an aqueous solution of iodine. The stretching ratio of the uniaxial stretching is preferably from 3 times to 7 times. The stretching may be performed after the dyeing treatment, or may be performed while the dyeing is performed. In addition, the dyeing may be performed after the stretching has been performed. The PVA-based film is subjected to swelling treatment, cross-linking treatment, washing treatment, drying treatment, or the like as required. For example, when the PVA-based film is immersed in water to be washed with water before the dyeing, contamination or an antiblocking agent on the surface of the PVA-based film can be washed off. In addition, the PVA-based film is swollen and hence dyeing unevenness or the like can be prevented.

The polarizer obtained by using the laminate is specifically, for example, a polarizer obtained by using a laminate of a resin substrate and a PVA-based resin layer (PVA-based resin film) laminated on the resin substrate, or a laminate of a resin substrate and a PVA-based resin layer formed on the resin substrate through application. The polarizer obtained by using the laminate of the resin substrate and the PVA-based resin layer formed on the resin substrate through application may be produced by, for example, a method involving: applying a PVA-based resin solution to the resin substrate; drying the solution to form the PVA-based resin layer on the resin substrate, thereby providing the laminate of the resin substrate and the PVA-based resin layer; and stretching and dyeing the laminate to turn the PVA-based resin layer into the polarizer. In this embodiment, the stretching typically includes the stretching of the laminate under a state in which the laminate is immersed in an aqueous solution of boric acid. The stretching may further include the aerial stretching of the laminate at high temperature (e.g., 95° C. or more) before the stretching in the aqueous solution of boric acid as required. The resultant laminate of the resin substrate and the polarizer may be used as it is (i.e., the resin substrate may be used as a protective layer for the polarizer). Alternatively, a product obtained as described below may be used: the resin substrate is peeled from the laminate of the resin substrate and the polarizer, and any appropriate protective layer in accordance with purposes is laminated on the peeling surface. Details of such method of producing a polarizer are disclosed in, for example, Japanese Patent Application Laid-open No. 2012-73580. The entire disclosure of the laid-open publication is incorporated herein by reference.

The thickness of the polarizer is typically from 1 µm to 80 µm. The upper limit of the thickness of the polarizer is preferably 50 µm, more preferably 25 µm, particularly preferably 12 µm. The lower limit of the thickness of the polarizer is preferably 1 µm, more preferably 3 µm. When the thickness of the polarizer falls within such range, curling at the time of heating can be satisfactorily suppressed, and besides, satisfactory external appearance durability at the time of heating is obtained.

The transmittance of the polarizer (also referred to as "single layer transmittance") at a wavelength of 589 nm is preferably 41% or more, more preferably 42% or more. The theoretical upper limit of the single layer transmittance is 50%. In addition, the polarization degree thereof is preferably from 99.5% to 100%, more preferably from 99.9% to 100%. As long as the polarization degree falls within the range, contrast in a front direction can be made higher when the polarizer is used in a liquid crystal display apparatus.

The single layer transmittance and polarization degree described above can be measured with a spectrophotometer. A specific measurement method for the polarization degree described above may involve measuring the parallel transmittance ($H_0$) and perpendicular transmittance ($H_{90}$) of the polarizer, and determining the polarization degree through the following expression: polarization degree (%)=$\{(H_0-H_{90})/(H_0+H_{90})\}^{1/2} \times 100$. The parallel transmittance ($H_0$) described above refers to a value of a transmittance of a parallel-type laminated polarizer manufactured by causing two identical polarizers to overlap with each other so that absorption axes thereof are parallel to each other. In addition, the perpendicular transmittance ($H_{90}$) described above refers to a value of a transmittance of a perpendicular-type laminated polarizer manufactured by causing two identical polarizers to overlap with each other so that absorption axes thereof are perpendicular to each other. Each of those transmittances is a Y value obtained through visibility correction with the two-degree field of view (C light source) of JIS Z 8701-1982.

The polarizing plate 10 is typically provided in a long shape (e.g., a roll shape) and used in the production of an optical member. In one embodiment, the polarizer has an absorption axis in its lengthwise direction. Such polarizer can be obtained by a production method that has been conventionally employed in the industry (e.g., such production method as described above). In another embodiment, the polarizer has the absorption axis in its widthwise direction. The optical member of the present invention can be produced by laminating such polarizer together with a linearly polarized light separation-type reflective polarizer having a reflection axis in its widthwise direction according to the so-called roll-to-roll process, and hence the efficiency of the production can be significantly improved.

B-2. Protective Layer

The protective layer is formed of any appropriate film that may be used as a protective film for the polarizing plate. Specific examples of a material serving as a main component of the film include transparent resins, such as a cellulose-based resin, such as triacetylcellulose (TAC), a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, a (meth)acrylic resin, and an acetate-based resin. Another example thereof is a thermosetting resin or a UV-curable resin, such as a (meth)acrylic resin, a urethane-based resin, a (meth) acrylic urethane-based resin, an epoxy-based resin, or a silicone-based resin. Still another example thereof is a glassy polymer, such as a siloxane-based polymer. Further, a polymer film disclosed in Japanese Patent Application Laid-open No. 2001-343529 (WO 01/37007 A1) may also be used. As a material for the film, for example, there may be used a resin composition containing: a thermoplastic resin having a substituted or unsubstituted imide group in a side chain; and a thermoplastic resin having a substituted or unsubstituted phenyl group and a nitrile group in side chains. An example thereof is a resin composition containing an alternate copolymer formed of isobutene and N-methylmaleimide, and an acrylonitrile-styrene copolymer. The polymer film may be an extruded product of the resin composition, for example. The protective layers may be identical to or different from each other.

The thickness of each of the protective layers is preferably from 10 µm to 100 µm, more preferably from 20 µm to 100 µm. Each of the protective layers may be laminated on the polarizer through intermediation of an adhesion layer (specifically an adhesive layer or a pressure-sensitive adhesive layer), or may be laminated so as to be in close contact with the polarizer (without through the adhesion layer). The adhesive layer is formed of any appropriate adhesive. The adhesive is, for example, a water-soluble adhesive using a polyvinyl alcohol-based resin as a main component. The water-soluble adhesive using the polyvinyl alcohol-based resin as a main component can preferably further contain a metal compound colloid. The metal compound colloid can be such that metal compound fine particles are dispersed in a dispersion medium, and the colloid can be a colloid that electrostatically stabilizes as a result of interactive repulsion between the charges of the same kind of the fine particles to permanently have stability. The average particle diameter of the fine particles forming the metal compound colloid may be any appropriate value as long as the average particle diameter does not adversely affect the optical characteristics of the polarizer, such as a polarization characteristic. The average particle diameter is preferably from 1 nm to 100 nm, more preferably from 1 nm to 50 nm. This is because the fine particles can be uniformly dispersed in the adhesive layer, its adhesion can be secured, and a knick can be suppressed. The term "knick" refers to a local uneven defect that occurs at an interface between the polarizer and each of the protective layers.

C. Reflective Polarizer

The reflective polarizer 20 has a function of transmitting polarized light in a specific polarization state (polarization direction) and reflecting light in a polarization state other than the foregoing. The reflective polarizer 20 may be of a linearly polarized light separation type or may be of a circularly polarized light separation type. Description is hereinafter given by taking the linearly polarized light separation-type reflective polarizer as an example. The circularly polarized light separation-type reflective polarizer is, for example, a laminate of a film obtained by fixing a cholesteric liquid crystal and a λ/4 plate.

Figure 6:
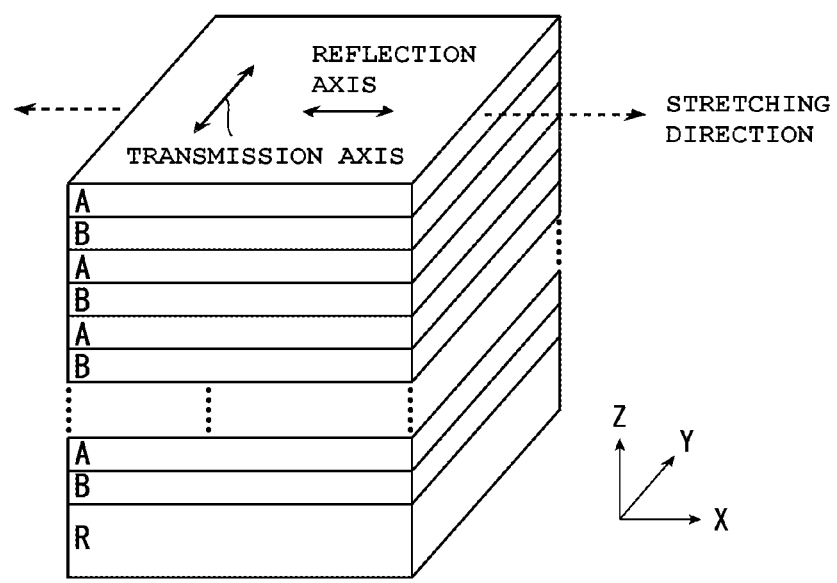
FIG. 6 is a schematic perspective view of an example of a reflective polarizer that may be used for the optical member of the present invention.

FIG. 6 is a schematic perspective view of an example of a reflective polarizer. The reflective polarizer is a multilayer laminate obtained by alternately laminating a layer A having birefringence and a layer B substantially free of birefringence. For example, the total number of the layers of such multilayer laminate can be from 50 to 1,000. In the illustrated example, a refractive index nx in the x-axis direction of the A layer is larger than a refractive index ny in the y-axis direction thereof, and a refractive index nx in the x-axis direction of the B layer and a refractive index ny in the y-axis direction thereof are substantially equal to each other. Therefore, a refractive index difference between the A layer and the B layer is large in the x-axis direction, and is substantially zero in the y-axis direction. As a result, the x-axis direction serves as a reflection axis and the y-axis direction serves as a transmission axis. The refractive index difference between the A layer and the B layer in the x-axis direction is preferably from 0.2 to 0.3. The x-axis direction corresponds to the stretching direction of the reflective polarizer in a production method to be described later.

The A layer is preferably formed of a material that expresses birefringence when stretched. Typical examples of such material include naphthalene dicarboxylic acid polyester (e.g., polyethylene naphthalate), polycarbonate, and an acrylic resin (e.g., polymethyl methacrylate). Of those, the polyethylene naphthalate is preferred. The B layer is preferably formed of a material that is substantially free of expressing birefringence even when stretched. Such material is typically, for example, a copolyester of naphthalene dicarboxylic acid and terephthalic acid.

The reflective polarizer transmits light having a first polarization direction (e.g., a p-wave) and reflects light having a second polarization direction perpendicular to the first polarization direction (e.g., a s-wave) at an interface between the A layer and the B layer. Part of the reflected light passes as light having the first polarization direction through the interface between the A layer and the B layer, and the other part thereof is reflected as light having the second polarization direction at the interface. Such reflection and transmission are repeated many times in the reflective polarizer, and hence the utilization efficiency of light can be improved.

In one embodiment, the reflective polarizer may include a reflective layer R as the outermost layer on an opposite side to the polarizing plate 10 as illustrated in FIG. 6. Light that has finally returned to the outermost portion of the reflective polarizer without being utilized can be further utilized by arranging the reflective layer R, and hence the utilization efficiency of the light can be further improved. The reflective layer R typically expresses a reflecting function by virtue of the multilayer structure of a polyester resin layer.

The total thickness of the reflective polarizer may be appropriately set depending on, for example, purposes and the total number of the layers in the reflective polarizer. The total thickness of the reflective polarizer is preferably from 10 μm to 150 μm. When the total thickness falls within such range, a distance between the light diffusing layer and the prism portion of the prism sheet can be caused to fall within a desired range. As a result, a liquid crystal display apparatus that suppresses the occurrence of the moire and has high luminance can be achieved.

In one embodiment, in the optical member, the reflective polarizer 20 is arranged so as to transmit light having a polarization direction parallel to the transmission axis of the polarizing plate 10 (substantially the polarizer 11). That is, the reflective polarizer 20 is arranged so that its transmission axis is in a direction approximately parallel to the direction of the transmission axis of the polarizing plate 10. With such configuration, light to be absorbed by the polarizing plate 10 can be recycled, the utilization efficiency can be further improved, and the luminance can be improved.

The reflective polarizer can be typically produced by combining co-extrusion and lateral stretching. The co-extrusion may be performed by any appropriate system. For example, the system may be a feed block system or may be a multi-manifold system. For example, a material for forming the A layer and a material for forming the B layer are extruded in a feed block, and are then formed into a plurality of layers with a multiplier. Such apparatus for forming the materials into a plurality of layers is known to one skilled in the art. Next, the resultant long multilayer laminate is typically stretched in a direction (TD) perpendicular to its conveying direction. The material for forming the A layer (e.g., polyethylene naphthalate) is increased in refractive index only in the stretching direction by the lateral stretching, and as a result, expresses birefringence. The material for forming the B layer (e.g., the copolyester of naphthalene dicarboxylic acid and terephthalic acid) is not increased in refractive index in any direction even by the lateral stretching. As a result, a reflective polarizer having a reflection axis in the stretching direction (TD) and having a transmission axis in the conveying direction (MD) can be obtained (the TD corresponds to the x-axis direction of FIG. 6 and the MD corresponds to the y-axis direction thereof). A stretching operation may be performed with any appropriate apparatus.

A polarizer disclosed in, for example, Japanese Patent Translation Publication No. Hei 9-507308 may be used as the reflective polarizer.

A commercial product may be used as it is as the reflective polarizer, or the commercial product may be subjected to secondary processing (e.g., stretching) before use. The commercial product is, for example, a product available under the product name "APCF" from Nitto Denko Corporation, a product available under the product name "DBEF" from 3M Company, or a product available under the product name "APF" from 3M Company.

The reflective polarizer 20 is bonded to an adjacent layer through intermediation of any appropriate adhesion layer (e.g., an adhesive layer or a pressure-sensitive adhesive layer: not shown). When the reflective polarizer 20 is adjacent to the light diffusing layer 50 as illustrated in FIG. 2, FIG. 4, and FIG. 5 and the light diffusing layer 50 is formed of a light diffusing pressure-sensitive adhesive, the adhesion layer between the reflective polarizer 20 and the light diffusing layer 50 may be absent.

D. Polarization Converting Layer

As described above, the polarization converting layer 30 is configured to convert the polarization state of light entering from the prism sheet 40 side and output the light to the reflective polarizer 20 side. In one embodiment, the polarization converting layer 30 is arranged between the reflective polarizer 20 and the prism sheet 40. In another embodiment, the polarization converting layer 30 is configured to function as the substrate portion of the prism sheet, and is arranged between the reflective polarizer 20 and the prism portion 42.

As described above, the polarization converting layer 30 has a polarization conversion degree $P_{CON}$, which is expressed by the following equation, of 0.2 or more.

Polarization conversion degree $(P_{CON})=L_{90}/L_0$

The polarization conversion degree $P_{CON}$ of the polarization converting layer 30 is preferably 0.3 or more, more preferably 0.5 or more, still more preferably 5 or more. Such polarization converting layer may include, for example, a high-retardation layer, a light diffusing layer, or a λ/4 plate.

D-1. High-Retardation Layer

The high-retardation layer is formed of a transparent material having birefringence. The in-plane retardation Re(550) of the high-retardation layer is preferably 3,500 nm or more, more preferably 4,000 nm or more. The thickness of the high-retardation layer is preferably from 0.1 μm to 200 μm, more preferably from 1 μm to 100 μm. An angle formed between the slow axis of the high-retardation layer and the reflection axis of the reflective polarizer 20 is preferably from 30° to 60°, more preferably from 40° to 50°, still more preferably about 45°.

The birefringence $\Delta n_{xy}$ of the high-retardation layer is, for example, 0.1 or more, preferably 0.2 or more. Meanwhile, the upper limit of the birefringence $\Delta n_{xy}$ is, for example, 1, preferably 0.8. When the birefringence is optimized to such range, a high-retardation layer that is thin and has desired optical characteristics can be obtained. The Nz coefficient of the high-retardation layer is preferably from 0.9 to 3, more preferably from 0.9 to 2.5, still more preferably from 0.9 to 1.5, particularly preferably from 0.9 to 1.3.

Any appropriate material may be adopted as the material for forming the high-retardation layer. Examples of the material include polyesters, such as polyethylene terephthalate and polyethylene naphthalate, polycarbonate, polystyrene, polyetheretherketone, polyphenylene sulfide, and a cycloolefin polymer. In particular, polyesters typified by polyethylene terephthalate each have large intrinsic birefringence and provide a large in-plane retardation relatively easily even when having a small thickness, and hence may be suitably used. The high-retardation layer is typically formed of polyethylene terephthalate.

D-2. Light Diffusing Layer

The light diffusing layer includes, for example, a diffusing sheet. The haze value of the diffusing sheet is preferably from 80% to 99.9%, more preferably from 90% to 99.9%. The thickness of the diffusing sheet may be appropriately adjusted depending on, for example, its configuration and diffusing performance, and is preferably from 1 μm to 200 μm, more preferably from 1 μm to 100 μm.

The diffusing sheet typically includes a light diffusing element. The light diffusing element includes a matrix and light-diffusible fine particles dispersed in the matrix. The matrix is formed of, for example, an acrylic resin, an aliphatic (e.g., polyolefin) resin, or a urethane-based resin. The light-diffusible fine particles are preferably polymer fine particles. As a material for the polymer fine particles, there are given, for example, a silicone resin, a methacrylic resin (e.g., polymethyl methacrylate), a polystyrene resin, a polyurethane resin, and a melamine resin. Those resins each have excellent dispersibility in a pressure-sensitive adhesive and an appropriate refractive index difference from the pressure-sensitive adhesive, and hence allow a diffusing sheet excellent in diffusing performance to be obtained. Of those, a silicone resin or polymethyl methacrylate is preferred. The shape of each of the light-diffusible fine particles may be, for example, a true spherical shape, a flat shape, or an amorphous shape. The light-diffusible fine particles may be used alone or in combination thereof.

The volume-average particle diameter of the light-diffusible fine particles is preferably from 0.1 μm to 50 μm, more preferably from 1 μm to 10 μm. When the volume-average particle diameter is set to fall within the above-mentioned range, a diffusing sheet having excellent light diffusing performance can be obtained. The volume-average particle diameter may be measured with, for example, an ultracentrifugal automatic particle size distribution-measuring apparatus.

The refractive index of each of the light-diffusible fine particles is preferably from 1.30 to 2.80, more preferably from 1.4 to 1.8.

The absolute value of a refractive index difference between each of the light-diffusible fine particles and the matrix is preferably more than 0 and 1 or less, more preferably more than 0 and 0.8 or less.

The content of the light-diffusible fine particles in the diffusing sheet is preferably 1 wt % or more and less than 100 wt %, more preferably from 5 wt % to 50 wt %. When the content of the light-diffusible fine particles is set to fall within the above-mentioned range, a diffusing sheet having excellent light diffusing performance can be obtained.

The diffusing sheet may contain any appropriate additive. Examples of the additive include an antistatic agent and an antioxidant.

D-3. λ/4 Plate

The thickness of the λ/4 plate is preferably from 0.1 μm to 200 μm, more preferably from 0.5 μm to 100 μm. The λ/4 plate typically has a slow axis. An angle formed between the slow axis of the λ/4 plate and the reflection axis of the reflective polarizer 20 is preferably from 30° to 60°, more preferably from 40° to 50°, still more preferably about 45°. The in-plane retardation Re(550) of the λ/4 plate is preferably from 70 nm to 200 nm, more preferably from 75 nm to 180 nm, still more preferably from 80 nm to 160 nm. The λ/4 plate preferably has a refractive index characteristic of showing a relationship of nx>ny≥nz. Herein, "ny=nz" encompasses not only a case in which ny and nz are exactly equal to each other, but also a case in which ny and nz are substantially equal to each other. Therefore, a relationship of ny<nz may be satisfied without impairing the effect of the present invention.

The birefringence $\Delta n_{xy}$ of the λ/4 plate is, for example, 0.0025 or more, preferably 0.0028 or more. Meanwhile, the upper limit of the birefringence $\Delta n_{xy}$ is, for example, 0.0060, preferably 0.0050. When the birefringence is optimized to fall within such range, a λ/4 plate that is thin and has desired optical characteristics can be obtained. The Nz coefficient of the λ/4 plate is preferably from 0.9 to 3, more preferably from 0.9 to 2.5, still more preferably from 0.9 to 1.5, particularly preferably from 0.9 to 1.3.

The λ/4 plate contains a resin having an absolute value of its photoelastic coefficient of preferably $2\times10^{-11}$ m$^2$/N or less, more preferably from $2.0\times10^{-13}$ m$^2$/N to $1.6\times10^{-11}$ m$^2$/N. When the absolute value of the photoelastic coefficient falls within such range, a retardation change is less liable to be generated in the case where a shrinkage stress is generated at the time of heating.

When the polarization converting layer is formed of the λ/4 plate, the optical member preferably includes the low-refractive index layer as illustrated in FIG. 2 to FIG. 5.

In one embodiment, the λ/4 plate may include any appropriate resin film that can satisfy the characteristics. Typical examples of such resin include a cyclic olefin-based resin, a polycarbonate-based resin, a cellulose-based resin, a polyester-based resin, a polyvinyl alcohol-based resin, a polyamide-based resin, a polyimide-based resin, a polyether-based resin, a polystyrene-based resin, and an acrylic resin. Any appropriate polycarbonate resin may be used as the polycarbonate resin as long as the effect of the present invention is obtained. The polycarbonate resin preferably contains: a structural unit derived from a fluorene-based dihydroxy compound; a structural unit derived from an isosorbide-based dihydroxy compound; and a structural unit derived from at least one dihydroxy compound selected from the group consisting of an alicyclic diol, an alicyclic dimethanol, di-, tri-, or polyethylene glycol, and an alkylene glycol or spiroglycol. The polycarbonate resin more preferably contains: a structural unit derived from a fluorene-based dihydroxy compound; a structural unit derived from an isosorbide-based dihydroxy compound; and a structural unit derived from an alicyclic dimethanol and/or a structural unit derived from di-, tri-, or polyethylene glycol. The polycarbonate resin still more preferably contains: a structural unit derived from a fluorene-based dihydroxy compound; a structural unit derived from an isosorbide-based dihydroxy compound; and a structural unit derived from di-, tri-, or polyethylene glycol. The polycarbonate resin may contain a structural unit derived from any other dihydroxy compound as required. Details of the polycarbonate resin that may be suitably used in the present invention are disclosed in, for example, Japanese Patent Application Laid-open No. 2014-10291 and Japanese Patent Application Laid-open No. 2014-26266. The disclosures of the laid-open publications are incorporated herein by reference.

In another embodiment, the λ/4 plate may be an alignment fixed layer of a liquid crystal compound. When the liquid crystal compound is used, a difference between nx and ny of the λ/4 plate to be obtained can be remarkably increased as compared to a non-liquid crystal material, and hence a thickness of the λ/4 plate for obtaining a desired in-plane retardation can be remarkably reduced. Typically, a rod-shaped liquid crystal compound is aligned in a state of being aligned in the slow axis direction of the λ/4 plate (homogeneous alignment). An example of the liquid crystal compound is a liquid crystal compound whose liquid crystal phase is a nematic phase (nematic liquid crystal). For example, a liquid crystal polymer or a liquid crystal monomer may be used as the liquid crystal compound. Any appropriate liquid crystal monomer may be adopted as the liquid crystal monomer. For example, a polymerizable mesogenic compound and the like disclosed in Japanese Patent Translation Publication No. 2002-533742 (WO 00/37585 A1), European Patent No. 358208 (U.S. Pat. No. 5,211,877), European Patent No. 66137 (U.S. Pat. No. 4,388,453), NO 93/22397 A1, European Patent No. 0261712, German Patent No. 19504224, German Patent No. 4408171, UK Patent No. 2280445, and the like may be used. Specific examples of such polymerizable mesogenic compound include a product available under the product name "LC242" from BASF SE, a product available under the product name "E7" from Merck KGaA, and a product available under the product name "LC-Sillicon-CC3767" from Wacker Chemie AG. Specific examples of the liquid crystal compound and details of a method of forming the alignment fixed layer are described in Japanese Patent Application Laid-open No. 2006-163343. The description of the laid-open publication is incorporated herein by reference. In another embodiment, typically, a disc-shaped liquid crystal compound is aligned in any one of the following states: vertical alignment, hybrid alignment, and tilt alignment. An example of the liquid crystal compound is a discotic liquid crystalline compound. The discotic liquid crystalline compound is typically such that the disc surface of the discotic liquid crystalline compound is aligned substantially vertically with respect to the film surface of the λ/4 plate. For example, a discotic liquid crystalline compound disclosed in Japanese Patent Application Laid-open No. 2007-108732 or Japanese Patent Application Laid-open No. 2010-244038 may be preferably used as the discotic liquid crystalline compound, but the discotic liquid crystalline compound is not limited thereto.

E. Prism Sheet

The prism sheet 40 is arranged on the opposite side of the polarization converting layer 30 to the reflective polarizer 20. The prism sheet 40 typically includes the substrate portion 41 and the prism portion 42. As illustrated in FIG. 5, the substrate portion 41 is not necessarily needed to be arranged when the polarization converting layer 30 may function as a substrate portion for supporting the prism portion 42. When the optical member of the present invention is arranged on the backlight side of a liquid crystal display apparatus, the prism sheet 40 guides polarized light, which has been output from the light guide plate of the backlight unit of the apparatus, as polarized light having the maximum intensity in an approximately normal direction of the liquid crystal display apparatus to the polarizing plate 10 through intermediation of the reflective polarizer 20 and the polarization converting layer 30 by means of, for example, total reflection in the prism portion 42 while maintaining the polarization state of the light. The term "approximately normal direction" comprehends a direction at a predetermined angle with respect to a normal direction, for example, a direction at an angle in the range of ±10° with respect to the normal direction.

The prism sheet 40 is bonded to the adjacent layer through intermediation of any appropriate adhesion layer (e.g., an adhesive layer or a pressure-sensitive adhesive layer: not shown).

E-1. Prism Portion

In one embodiment, as illustrated in FIG. 1, the prism sheet 40 (substantially the prism portion 42) includes an array of a plurality of unit prisms 43, which are convex toward an opposite side to the reflective polarizer 20, in a parallel manner. Each of the unit prisms 43 is preferably columnar, and its lengthwise direction (edge line direction) is directed toward a direction approximately perpendicular, or a direction approximately parallel, to the transmission axis of the polarizing plate 10 and the transmission axis of the reflective polarizer 20. In this specification, the expressions "substantially perpendicular" and "approximately perpendicular" include a case in which an angle formed by two directions is 90°±10°, and the angle is preferably 90°±7°, more preferably 90°±5°. The expressions "substantially parallel" and "approximately parallel" include a case in which an angle formed by two directions is 0°±10°, and the angle is preferably 0°±7°, more preferably 0°±5°. Moreover, in this specification, such a simple expression "perpendicular" or "parallel" may include a substantially perpendicular state or a substantially parallel state. The prism sheet 40 may be arranged so that the edge line direction of each of the unit prisms 43, and each of the transmission axis of the polarizing plate 10 and the transmission axis of the reflective polarizer 20 form a predetermined angle (the so-called oblique arrangement). The adoption of such configuration can prevent the occurrence of the moire in a more satisfactory manner in some cases. The range of the oblique arrangement is preferably 20° or less, more preferably 15° or less.

Any appropriate configuration may be adopted as the shape of each of the unit prisms 43 as long as the effect of the present invention is obtained. The shape of a section of each of the unit prisms 43 parallel to its arrangement direction and parallel to its thickness direction may be a triangular shape or may be any other shape (e.g., such a shape that one of, or each of both, the inclined planes of a triangle has a plurality of flat surfaces having different tilt angles). The triangular shape may be a shape asymmetric with respect to a straight line passing the apex of the unit prism and perpendicular to the surface of the sheet (e.g., a scalene triangle), or may be a shape symmetric with respect to the straight line (e.g., an isosceles triangle). Further, the apex of the unit prism may be of a chamfered curved surface shape, or may be of a shape whose section is a trapezoid, the shape being obtained by such cutting that its tip becomes a flat surface. Detailed shapes of the unit prisms 43 may be appropriately set depending on purposes. For example, a configuration disclosed in Japanese Patent Application Laid-open No. Hei 11-84111 may be adopted for each of the unit prisms 43.

The distance between the prism portion 42 and the light diffusing layer 50 is preferably from 75 µm to 250 µm. The securement of such distance between the prism portion and the light diffusing layer can satisfactorily suppress the occurrence of the moire while maintaining the front contrast and luminance of the liquid crystal display apparatus. The distance between the prism portion 42 and the light diffusing layer 50 can be controlled by adjusting, for example, the thickness of the reflective polarizer 20, the substrate portion 41, and/or the adhesion layer between the reflective polarizer 20 and the prism sheet 40. The distance between the prism portion 42 and the light diffusing layer 50 refers to a distance between the flat surface of the prism portion 42 (surface opposite to the apices of the unit prisms 43) and the surface of the light diffusing layer 50 on the reflective polarizer 20 side.

E-2. Substrate Portion

When the substrate portion 41 is arranged in the prism sheet 40, the substrate portion 41 and the prism portion 42 may be integrally formed by, for example, subjecting a single material to extrusion, or the prism portion may be shaped on a film for the substrate portion. The thickness of the substrate portion is preferably from 25 µm to 150 µm. Such thickness is preferred from the viewpoints of the handling property and strength of the prism sheet.

Any appropriate material may be adopted as a material for forming the substrate portion 41 depending on purposes and the configuration of the prism sheet. When the prism portion is shaped on the film for the substrate portion, the film for the substrate portion is specifically, for example, a film formed of cellulose triacetate (TAC), a (meth)acrylic resin, such as polymethyl methacrylate (PMMA), or a polycarbonate (PC) resin. The film is preferably an unstretched film.

When the substrate portion 41 and the prism portion 42 are integrally formed of a single material, the same material as a material for forming the prism portion when the prism portion is shaped on the film for the substrate portion can be used as the material. Examples of the material for forming the prism portion include epoxy acrylate- and urethane acrylate-based reactive resins (e.g., an ionizing radiation-curable resin). When the prism sheet of an integral configuration is formed, a polyester resin, such as PC or PET, an acrylic resin, such as PMMA or MS, or an optically transparent thermoplastic resin, such as cyclic polyolefin, can be used.

The photoelastic coefficient of the substrate portion 41 is preferably from $-10\times10^{-12}$ m$^2$/N to $10\times10^{-12}$ m$^2$/N, more preferably from $-5\times10^{-12}$ m$^2$/N to $5\times10^{-12}$ m$^2$/N, still more preferably from $-3\times10^{-12}$ m$^2$/N to $3\times10^{-12}$ m$^2$/N.

In one embodiment, the substrate portion 41 substantially has optical isotropy. The phrase "substantially have optical isotropy" as used herein means that a retardation value is so small as to have substantially no influences on the optical characteristics of the liquid crystal display apparatus. For example, an in-plane retardation Re of the substrate portion is preferably 20 nm or less, more preferably 10 nm or less. In another embodiment, the polarization converting layer 30 having the optical characteristics described in the section D may function as the substrate portion.

F. Light Diffusing Layer

The light diffusing layer 50 may be arranged between the polarizing plate 10 and the reflective polarizer 20 as illustrated in FIG. 2, FIG. 4, and FIG. 5, or may be arranged between the reflective polarizer 20 and the prism sheet 40 as illustrated in FIG. 3. The light diffusing layer 50 may be formed of a light diffusing element or may be formed of a light diffusing pressure-sensitive adhesive. The light diffusing element includes a matrix and light-diffusible fine particles dispersed in the matrix. The matrix of the light diffusing pressure-sensitive adhesive is formed of a pressure-sensitive adhesive. The light diffusing layer 50 is preferably integrated with the other constituent layers of the optical member.

The light diffusing performance of the light diffusing layer can be represented by, for example, a haze value and/or a light diffusing half-value angle. The haze value of the light diffusing layer is preferably from 10% to 99%, more preferably from 20% to 95%. The setting of the haze value within the range provides desired diffusing performance and hence can satisfactorily suppress the occurrence of the moire. The light diffusing half-value angle of the light diffusing layer is preferably from 5° to 50°, more preferably from 10° to 30°. The light diffusing performance of the light diffusing layer can be controlled by adjusting, for example, a constituent material for the matrix (the pressure-sensitive adhesive in the case of the light diffusing pressure-sensitive adhesive), and a constituent material for, and the volume-average particle diameter and compounding amount of, the light-diffusible fine particles.

The total light transmittance of the light diffusing layer is preferably 75% or more, more preferably 80% or more, still more preferably 85% or more.

The thickness of the light diffusing layer may be appropriately adjusted depending on, for example, its configuration and diffusing performance. For example, when the light diffusing layer is formed of the light diffusing element, the thickness is preferably from 5 µm to 200 µm. In addition, for example, when the light diffusing layer is formed of the light diffusing pressure-sensitive adhesive, the thickness is preferably from 5 µm to 100 µm.

When the light diffusing layer is formed of the light diffusing element, the matrix is formed of, for example, an ionizing radiation-curable resin. An ionizing radiation is, for example, UV light, visible light, an infrared ray, or an electron beam. Of those, the UV light is preferred. Therefore, the matrix is preferably formed of a UV-curable resin. Examples of the UV-curable resin include an acrylic resin, an aliphatic (e.g., polyolefin) resin, and a urethane-based resin.

The light diffusing layer is preferably formed of the light diffusing pressure-sensitive adhesive. The adoption of such configuration eliminates the need for an adhesion layer (an adhesive layer or a pressure-sensitive adhesive layer) needed in the case where the light diffusing layer is formed of the light diffusing element. Accordingly, the adoption can contribute to the thinning of the optical member (consequently, a liquid crystal display apparatus) and eliminate the adverse effects of the adhesion layer on the display characteristics of the liquid crystal display apparatus. In this case, the light diffusing layer contains a pressure-sensitive adhesive and light-diffusible fine particles dispersed in the pressure-sensitive adhesive.

Any appropriate pressure-sensitive adhesive and light-diffusible fine particles may be used as the pressure-sensitive adhesive and the light-diffusible fine particles. Details of the pressure-sensitive adhesive and the light-diffusible fine particles are described in, for example, Japanese Patent Application Laid-open No. 2014-224964. The entire description of the laid-open publication is incorporated herein by reference.

The content of the pressure-sensitive adhesive in the light diffusing pressure-sensitive adhesive is preferably from 50 wt % to 99.7 wt %, more preferably from 52 wt % to 97 wt %.

The content of the light-diffusible fine particles in the light diffusing pressure-sensitive adhesive is preferably from 0.3 wt % to 50 wt %, more preferably from 3 wt % to 48 wt %. When the content of the light-diffusible fine particles is set to fall within the above-mentioned range, a light diffusing pressure-sensitive adhesive layer having excellent light diffusing performance can be obtained.

The pressure-sensitive adhesive may contain any appropriate additive and/or cross-linking agent. Examples of the additive include an antistatic agent, an antioxidant, and a coupling agent. The kinds, addition amounts, combination, and the like of the additives may be appropriately set depending on purposes. Examples of the cross-linking agent include an organic cross-linking agent and a polyfunctional metal chelate.

G. Low-Refractive Index Layer

The low-refractive index layer 60 may be arranged between the polarizing plate 10 and the reflective polarizer 20 as illustrated in FIG. 2 and FIG. 3, or may be arranged between the reflective polarizer 20 and the prism sheet 40 as illustrated in FIG. 4 and FIG. 5. The low-refractive index layer 60 is preferably integrated with the other constituent layers of the optical member.

The thickness of the low-refractive index layer is preferably from 0.2 µm to 5 µm, more preferably from 0.3 µm to 3 µm. The refractive index of the low-refractive index layer 60 is preferably 1.30 or less, more preferably 1.20 or less. The lower limit of the refractive index of the low-refractive index layer is, for example, 1.01. When the refractive index of the low-refractive index layer falls within such range, the utilization efficiency of light can be enhanced by sufficiently securing the amount of light to be output in a front direction and suppressing the generation of light in a direction in which the light cannot be output to a viewer side. As a result, a liquid crystal display apparatus having a high luminance can be achieved through the use of the optical member.

The low-refractive index layer 60 typically has a void in itself. The void ratio of the low-refractive index layer is, for example, from 5% to 90%, preferably from 25% to 80%. When the void ratio falls within the range, the low-refractive index layer can be sufficiently reduced in refractive index, and a high mechanical strength can be achieved.

The low-refractive index layer having a void in itself is, for example, a low-refractive index layer at least partially having a porous layer and/or an air layer. The porous layer typically contains aerogel and/or particles (e.g., hollow fine particles and/or porous particles). The low-refractive index layer may be preferably a nanoporous layer (specifically a porous layer 90% or more of the fine pores of which each have a diameter in the range of from $10^{-1}$ to $10^3$ nm).

Any appropriate material may be adopted as a material for forming the low-refractive index layer. For example, materials disclosed in WO 2004/113966 A1, Japanese Patent Application Laid-open No. 2013-254183, and Japanese Patent Application Laid-open No. 2012-189802 may each be adopted as the material. Specific examples thereof include: silica-based compounds; hydrolyzable silanes, and partial hydrolysates and dehydration condensates thereof; organic polymers; silicon compounds each containing a silanol group; active silica obtained by bringing a silicate into contact with an acid or an ion exchange resin; polymerizable monomers (e.g., a (meth)acrylic monomer and a styrene-based monomer); curable resins (e.g., a (meth)acrylic resin, a fluorine-containing resin, and a urethane resin); and a combination thereof.

Any appropriate particles may be adopted as the particles. The particles are each typically formed of a silica-based compound. Examples of the shape of each of the particles include a spherical shape, a plate-like shape, a needle-like shape, a string-like shape, and a grape cluster-like shape. Examples of a particle of the string-like shape include: a particle obtained by connecting a plurality of particles each having a spherical shape, a plate-like shape, or a needle-like shape in a beaded manner; a short fibrous particle (e.g., a short fibrous particle disclosed in Japanese Patent Application Laid-open No. 2001-188104); and a combination thereof. The string-shaped particle may be linear or may be branched. A particle of the grape cluster-like shape is, for example, a particle of a grape cluster-like shape obtained by the agglomeration of a plurality of particles having spherical, plate-like, and needle-like shapes. The shapes of the particles may be confirmed by, for example, observation with a transmission electron microscope. The average particle diameter of the particles is, for example, from 5 nm to 200 nm, preferably from 10 nm to 200 nm. The presence of the above-mentioned configuration can provide a low-refractive index layer having a sufficiently low refractive index and can maintain the transparency of the low-refractive index layer. The term "average particle diameter" as used herein means a value determined by using a specific surface area (m²/g) measured by a nitrogen adsorption method (BET method) from an equation "average particle diameter=(2,720/specific surface area)" (see Japanese Patent Application Laid-open No. Hei 1-317115).

Examples of a method of obtaining the low-refractive index layer include methods disclosed in Japanese Patent Application Laid-open No. 2010-189212, Japanese Patent Application Laid-open No. 2008-040171, Japanese Patent Application Laid-open No. 2006-011175, WO 2004/113966 A1, and references thereof. Specific examples thereof include: a method involving subjecting at least one of silica-based compounds, and hydrolyzable silanes, and partial hydrolysates and dehydration condensates thereof to hydrolysis and polycondensation; a method involving using porous particles and/or hollow fine particles; and a method involving utilizing a spring-back phenomenon to produce an aerogel layer.

H. Polarizing Plate Set

The optical member of the present invention can be typically used as a polarizing plate arranged on the opposite side of a liquid crystal display apparatus to its viewer side (hereinafter sometimes referred to as "back-surface side polarizing plate"). In this case, a polarizing plate set including the back-surface side polarizing plate and a viewer side polarizing plate can be provided. Any appropriate polarizing plate may be adopted as the viewer side polarizing plate. The viewer side polarizing plate typically includes a polarizer (e.g., an absorption-type polarizer) and a protective layer arranged on at least one side of the polarizer. Those described in the section B can be used as the polarizer and the protective layer. The viewer side polarizing plate may further have any appropriate optical functional layer (e.g., a retardation layer, a hard coat layer, an antiglare layer, or an antireflection layer) depending on purposes. The polarizing plate set is arranged on each side of a liquid crystal cell so that the absorption axis of (the polarizer of) the viewer side polarizing plate and the absorption axis of (the polarizer of) the back-surface side polarizing plate are substantially perpendicular or parallel to each other.

I. Liquid Crystal Display Apparatus

Figure 7:
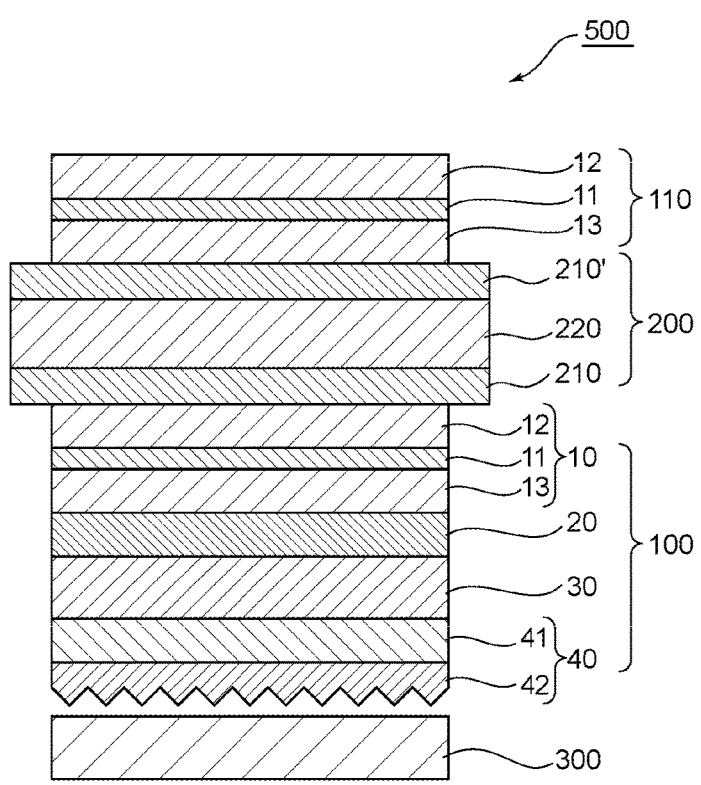
FIG. 7 is a schematic cross-sectional view of a liquid crystal display apparatus according to one embodiment of the present invention.

FIG. 7 is a schematic sectional view of a liquid crystal display apparatus according to one embodiment of the present invention. A liquid crystal display apparatus 500 includes a liquid crystal cell 200, a viewer side polarizing plate 110 arranged on the viewer side of the liquid crystal cell 200, the optical member 100 of the present invention serving as a back-surface side polarizing plate arranged on the opposite side of the liquid crystal cell 200 to the viewer side, and a backlight unit 300 arranged on the opposite side of the optical member 100 to the liquid crystal cell 200. In the liquid crystal display apparatus 500, each of the optical members 101 to 104 may be used instead of the optical member 100. The viewer side polarizing plate is as described in the section H. In the illustrated example, the viewer side polarizing plate 110 includes the polarizer 11, the protective layer 12 arranged on one side of the polarizer, and the protective layer 13 arranged on the other side of the polarizer 11. The viewer side polarizing plate 110 and the optical member (back-surface side polarizing plate) 100 are arranged so that their respective absorption axes are substantially perpendicular or parallel to each other. Any appropriate configuration may be adopted for the backlight unit 300. For example, the backlight unit 300 may be of an edge light system or may be of a direct system. When the direct system is adopted, the backlight unit 300 includes, for example, a light source, a reflective film, and a diffuser (none of which is shown). When the edge light system is adopted, the backlight unit 300 can further include a light guide plate and a light reflector (none of which is shown).

The liquid crystal cell 200 includes a pair of substrates 210 and 210', and a liquid crystal layer 220 serving as a display medium sandwiched between the substrates. In a general configuration, on the substrate 210' serving as one in the pair, a color filter and a black matrix are arranged, and on the substrate 210 serving as the other in the pair, there are arranged switching elements for controlling the electro-optical property of the liquid crystal, scanning lines for giving gate signals to the switching elements and signal lines for giving source signals thereto, and pixel electrodes and counter electrodes. An interval (cell gap) between the above-mentioned substrates 210 and 210' can be controlled by spacers and the like. On sides of the above-mentioned substrates 210 and 210', which are brought into contact with the liquid crystal layer 220, for example, alignment films made of polyimide and the like can be arranged.

Now, the present invention is specifically described by way of Examples. However, the present invention is not limited by these Examples.

EXAMPLE 1

1. Production of Optical Member 1-1. Production of Polarizing Plate

A polyvinyl alcohol film having a thickness of 80 μm was stretched to 3 times between rolls having different speed ratios while being dyed in an iodine solution at 30° C. having a concentration of 0.3% for 1 minute. After that, the film was stretched until the total stretching ratio became 6 times while being immersed in an aqueous solution at 60° C. containing boric acid at a concentration of 4% and potassium iodide at a concentration of 10% for 0.5 minute. Subsequently, the film was washed by being immersed in an aqueous solution at 30° C. containing potassium iodide at a concentration of 1.5% for 10 seconds, and was then dried at 50° C. for 4 minutes to provide a polarizer. To each of both surfaces of the polarizer, a saponified triacetylcellulose film having a thickness of 80 μm was bonded through the use of a polyvinyl alcohol-based adhesive. Thus, a polarizing plate was produced.

1-2. Production of Polarization Converting Layer

A high-retardation layer was used as a polarization converting layer, and a biaxially stretched PET film (manufactured by Toyobo Co., Ltd., product name: "A4300", thickness: 75 μm) was used as the high-retardation layer. The in-plane retardation Re of the biaxially stretched PET film was 4,000 nm.

1-3. Production of Reflective Polarizer

A 40-inch TV manufactured by Sharp Corporation (product name: AQUOS, item's stock number: LC40-Z5) was dismantled, and a reflective polarizer was removed from its backlight member. Diffusing layers arranged on both surfaces of the reflective polarizer were removed, and the remainder was defined as a reflective polarizer (thickness: 92 μm) of this Example.

1-4. Production of Prism Sheet

An acrylic resin film (thickness; 40 μm) obtained by a production method described in Production Example 1 of Japanese Patent Application Laid-open No. 2012-234163 was used as a film for a substrate portion. A predetermined mold having placed therein the acrylic resin film was filled with a UV-curable urethane acrylate resin serving as a material for a prism, and the material for a prism was cured by being irradiated with UV light. Thus, a prism sheet as illustrated in FIG. 1 was produced. The in-plane retardation Re of its substrate portion was 0.4 nm. Its unit prism was a triangular prism, and the shape of a cross-section of the unit prism parallel to an arrangement direction and parallel to a thickness direction was a scalene triangle shape.

1-5. Production of Optical Member

The biaxially stretched PET film, the reflective polarizer, and the polarizing plate were bonded in the stated order to the substrate portion side of the prism sheet through intermediation of a pressure-sensitive adhesive to produce an optical member. The components were arranged so that: the absorption axis of the polarizing plate and the reflection axis of the reflective polarizer were parallel to each other; an angle formed between the reflection axis of the reflective polarizer and the slow axis of the biaxially stretched PET film was 45°; and the absorption axis of the polarizing plate and the edge line of the prism sheet were parallel to each other.

2. Production of Optical Member Including No Reflective Polarizer

The biaxially stretched PET film and the polarizing plate were bonded in the stated order to the substrate portion side of the prism sheet through intermediation of a pressure-sensitive adhesive to produce an optical member including no reflective polarizer. The components were arranged so that: an angle formed between the absorption axis of the polarizing plate and the slow axis of the biaxially stretched PET film was 45°; and the absorption axis of the polarizing plate and the edge line of the prism sheet were parallel to each other.

EXAMPLE 2

An optical member and an optical member including no reflective polarizer Were produced in the same manner as in Example 1 except that: a light diffusing layer was used as the polarization converting layer; and a light diffusing sheet removed from a 40-inch TV manufactured by Sharp Corporation (product name: AQUOS, item's stock number: L 40-Z5) through its dismantlement was used as the light diffusing layer. The haze value of the light diffusing sheet was 92%.

EXAMPLE 3

1. Production of Polarization Converting layer

A λ/4 plate was used as a polarization converting layer, and a λ/4 plate obtained by obliquely stretching a cycloolefin-based resin film (manufactured by Zeon Corporation, "ZEONOR ZF-14 Film") at a stretching angle of 45° with a tenter stretching machine was used as the λ/4 plate. The in-plane retardation Re(550) of the obtained λ/4 plate was 90 nm.

2. Production of Acrylic Film with Low-refractive Index Layer (1) Gelation of Silicon Compound 0.95 g of MTMS serving as a precursor of a silicon compound was dissolved in 2.2 g of DMSO. To the thus obtained mixed liquid, 0.5 g of a 0.01 mol/L oxalic acid aqueous solution was added, and the mixture was stirred at room temperature for 30 minutes to hydrolyze the MTMS. Thus, tris(hydroxy)methylsilane was produced.

To 5.5 g of DMSO, 0.38 g of ammonia water having a concentration of 28%, and 0.2 g of pure water were added, and then the mixed liquid subjected to the hydrolysis treatment was further added. The mixture was stirred at room temperature for 15 minutes to perform gelation of the tris(hydroxy)methylsilane. Thus, a gelled silicon compound was obtained.

(2) Maturation Treatment

The mixed liquid subjected to the gelation treatment was subjected to maturation treatment by being incubated as it was at 40° C. for 20 hours.

(3) Pulverization Treatment

Next, the gelled silicon compound subjected to the maturation treatment was crushed with a spatula into a granular shape having a size of from several millimeters to several centimeters. To the crushed product, 40 g of IPA was added, and the mixture was lightly stirred. After that, the mixture was left to stand still at room temperature for 6 hours, and the solvent and catalyst in the gel were decanted. The same decantation treatment was repeated 3 times to complete solvent replacement. Then, the gelled silicon compound in the mixed liquid was subjected to pulverization treatment (high-pressure media-less pulverization). The pulverization treatment (high-pressure media-less pulverization) was performed by weighing out 1.85 g of the gelled compound after the completion of the solvent replacement and 1.15 g of IPA in a 5 cm$^3$ screw-capped vial, and then pulverizing the contents under the conditions of 50 W and 20 kHz for 2 minutes through the use of a homogenizer (product name: UH-50, manufactured by SMT Corporation).

As a result of the pulverization of the gelled silicon compound in the mixed liquid through the pulverization treatment, the mixed liquid became a sol liquid of the pulverized product. A volume-average particle diameter indicating the particle size variation of the pulverized product contained in the mixed liquid was found to be from 0.50 to 0.70 with a dynamic light scattering Nanotrac particle size analyzer (manufactured by Nikkiso Co., Ltd., model UPA-EX150). Further, to 0.75 g of the sol liquid, a solution of a photobase generator (Wako Pure Chemical industries, Ltd.: product name: WPBG-266) in methyl ethyl ketone (MEK) at a concentration of 1.5% and a solution of bis(trimetboxysilyl)ethane in MEK at a concentration of 5% were added at a ratio of 0.062 g: 0.036 g to provide an application liquid.

(4) Formation of Low-refractive Index Layer

The application liquid was applied to the substrate surface of an acrylic resin film (thickness: 40 μm) prepared in accordance with Production Example 1 of Japanese Patent Application Laid-open No. 2012-234163 to form an applied film. The applied film was dried by being treated at a temperature of 100° C. for 1 minute, and further, the applied film after the drying was subjected to UV irradiation with light having a wavelength of 360 nm at a light irradiation dose (energy) of 300 mJ/cm² to provide a laminate having a low-refractive index layer formed on the acrylic resin film (acrylic film with a low-refractive index layer). The refractive index of the low-refractive index layer was 1.18.

3. Production of Optical Member and Optical Member Including No Reflective Polarizer An optical member was produced in the same manner as in Example 1 except that: the reflective polarizer and the λ/4 plate were arranged so that the angle formed between the reflection axis of the reflective polarizer and the slow axis of the λ/4 plate was 45°; and the acrylic film with a low-refractive index layer was arranged between the polarizing plate and the reflective polarizer. In addition, an optical member including no reflective polarizer was produced in the same manner as in Example 1 except that: the polarizing plate and the λ/4 plate were arranged so that the angle formed between the absorption axis of the polarizing plate and the slow axis of the λ/4 plate was 45°; and the acrylic film with a low-refractive index layer was arranged between the polarizing plate and the λ/4 plate.

Comparative Example 1

An optical member and an optical member including no reflective polarizer were produced in the same manner as in Example 1 except that no polarization converting layer was used.

Comparative Example 2

An optical member was produced in the same manner as in Example 3 except that the reflective polarizer and the λ/4 plate were arranged so that the angle formed between the reflection axis of the reflective polarizer and the slow axis of the λ/4 plate was 0°. In addition, an optical member including no reflective polarizer was produced in the same manner as in Example 3 except that the polarizing plate and the λ/4 plate were arranged so that the angle formed between the absorption axis of the polarizing plate and the slow axis of the λ/4 plate was 0°.

(Evaluation)

Characteristics of the optical member of each of Examples and Comparative Examples were measured as described below.

1. Measurement of Polarization Conversion Degree $P_{CON}$ 1-1. Polarizing Plate for Evaluation In accordance with the following procedure, a first polarizing plate and second polarizing plate to be used for the measurement of a polarization conversion degree $P_{CON}$ were produced. First, a polyvinyl alcohol film having a thickness of 80 μm was stretched to 3 times between rolls having different speed ratios while being dyed in an iodine solution at 30° C. having a concentration of 0.3% for 1 minute. After that, the film was stretched until the total stretching ratio became 6 times while being immersed in an aqueous solution at 60° C. containing boric acid at a concentration of 4% and potassium iodide at a concentration of 10% for 0.5 minute. Subsequently, the film was washed by being immersed in an aqueous solution at 30° C. containing potassium iodide at a concentration of 1.5% for 10 seconds, and was then dried at 50° C. for 4 minutes to provide a polarizer. To each of both surfaces of the polarizer, a saponified triacetylcellulose film having a thickness of 80 μm was bonded through the use of a polyvinyl alcohol-based adhesive to produce the first polarizing plate. The second polarizing plate was similarly produced.

The obtained first polarizing plate and second polarizing plate were each measured for a single layer transmittance (Ts), a parallel transmittance (Tp), and a cross transmittance (Tc) with a UV-visible spectrophotometer (V-7100 manufactured by JASCO Corporation), and a polarization degree (P) was determined by the following equation. Those transmittances are Y values measured with the two-degree field of view (C light source) of JIS Z 8701 and subjected to visibility correction. Light absorption of the triacetylcellulose film serving as a protective layer is negligibly small as compared to light absorption of the polarizer, and hence the transmittances of each polarizing plate were defined as the transmittances of its polarizer.

Polarization degree $(P) = \{(Tp-Tc)/(Tp+Tc)\}^{1/2} \times 100$

The polarization degree of the polarizer of each of the first polarizing plate and the second polarizing plate was 99.99%.

1-2. Polarization Conversion Degree

A backlight light source removed from a liquid crystal display apparatus (manufactured by Sony Corporation, product name: "VAIO-S"), the first polarizing plate, the polarization converting layer used in each of Examples and Comparative Examples, the second polarizing plate, and a conoscope (manufactured by Autronic-Melchers GmbH) were arranged in the stated order, and the luminance of the light source was measured (unit: cd/m²) through intermediation of the first polarizing plate, the polarization converting layer, and the second polarizing plate. The luminance when the respective polarizers of the first polarizing plate and the second polarizing plate were arranged so that the absorption axes thereof were parallel to each other was defined as a parallel luminance $L_0$, and the luminance when the respective polarizers of the first polarizing plate and the second polarizing plate were arranged so that the absorption axes thereof were perpendicular to each other was defined as a perpendicular luminance $L_{90}$. The polarization conversion degree $P_{CON}$ exhibited by the polarization converting layer was determined by the following equation.

Polarization conversion degree $(P_{CON}) = L_{90}/L_0$

2. Measurement of Luminance Enhancement Degree Exhibited by Reflective Polarizer A glass plate having a thickness of 0.4 mm was bonded to the polarizing plate side of an optical member through intermediation of a pressure-sensitive adhesive to produce a measurement sample. A glass plate having a thickness of 0.4 mm was bonded to the polarizing plate side of an optical member including no reflective polarizer through intermediation of a pressure-sensitive adhesive to produce a measurement sample for comparison. A backlight light source removed from a liquid crystal display apparatus (manufactured by Sony Corporation, product name: "VAIO-S") was arranged on the back-surface side of the measurement sample (opposite side to the glass plate), and the front luminance of light transmitted through the measurement sample was measured (unit: cd/m²) with a conoscope (manufactured by Autronic-Melchers GmbH). Similarly, the front luminance of light transmitted through the measurement sample for comparison was measured (unit: cd/m²). A luminance enhancement degree C (%) exhibited by the reflective polarizer was determined by the following equation on the basis of the front luminance A of the light transmitted through the measurement sample and the front luminance B of the light transmitted through the measurement sample for comparison.

Luminance enhancement degree $(C)=((A/B)-1)\times 100$ (%)

3. Measurement of In-plane Retardations of High-retardation Layer and λ/4 Plate A sample having a size of 50 mm×50 mm was cut out of each of the high-retardation layer and the λ/4 plate used in Examples 1 and 3, and the λ/4 plate used in Comparative Example 2, and was used as a measurement sample. The produced measurement sample was measured for an in-plane retardation with Axoscan (manufactured by Axometrics, Inc.). A measurement temperature was set to 23° C., and a measurement wavelength was set to 550 nm.

4. Measurement of Haze Value

The haze value of the light diffusing layer used in Example 2 was measured by a method specified in JIS 7136 with a haze meter (manufactured by Murakami Color Research Laboratory Co., Ltd., product name: "HN-150").

5. Measurement of Refractive Index of Low-refractive Index Layer

The low-refractive index layer used in Example 3 was measured for a refractive index using an Abbe refractometer (DR-M2, manufactured by Atago Co., Ltd.).

The luminance enhancement degree (C) of the optical member of each of Examples and Comparative Examples, and the polarization conversion degree ($P_{CON}$) of the polarization converting layer of each optical member are shown in Table 1.

TABLE 1

|  | Polarization converting layer | Polarization conversion degree | Luminance enhancement degree |
| --- | --- | --- | --- |
| Example 1 | High-retardation layer | 0.56 | 22% |
| Example 2 | Light diffusing layer | 6.2 | 25% |
| Example 3 | λ/4 plate (45°) | 31.6 | 29% |
| Comparative Example 1 | — | 0.06 | 6% |
| Comparative Example 2 | λ/4 plate (0°) | 0.19 | 11% |

As apparent from Table 1, as the polarization conversion degree ($P_{CON}$) of the polarization converting layer increased, the luminance enhancement degree (C) of the optical member increased, i.e., a higher luminance enhancement effect of the use of the reflective polarizer was obtained.

The optical member of the present invention can be suitably used as the back-surface side polarizing plate of a liquid crystal display apparatus. The liquid crystal display apparatus using such optical member can be used for various applications, such as portable devices including a personal digital assistant (PDA), a cellular phone, a watch, a digital camera, and a portable gaming machine, OA devices including a personal computer monitor, a notebook-type personal computer, and a copying machine, electric home appliances including a video camera, a liquid crystal television set, and a microwave oven, on-board devices including a reverse monitor, a monitor for a car navigation system, and a car audio, exhibition devices including an information monitor for a commercial store, security devices including a surveillance monitor, and caring/medical devices including a caring monitor and a medical monitor.

What is claimed is:

1. An optical member, comprising:
   a polarizing plate;
   a reflective polarizer;
   a polarization converting layer; and
   a prism layer,
   the polarizing plate, the reflective polarizer, the polarization converting layer, and the prism layer being integrated in the stated order,
   wherein the polarization converting layer satisfies the following expression:

$L_{90}/L_0 \geq 0.2$ where, with regard to a luminance of natural light transmitted through a first polarizer and a second polarizer each having a polarization degree of 99.99%,
   $L_0$ represents a parallel luminance, which is the luminance when the polarization converting layer is arranged between the first polarizer and the second polarizer arranged so that absorption axes thereof are parallel to each other, and
   $L_{90}$ represents a perpendicular luminance, which is the luminance when the polarization converting layer is arranged between the first polarizer and the second polarizer arranged so that the absorption axes thereof are perpendicular to each other.

2. The optical member according to claim 1,
   wherein the polarization converting layer comprises a retardation layer, and
   wherein the retardation layer has an in-plane retardation Re(550) of 3,500 nm or more, where Re(550) represents an in-plane retardation measured with light having a wavelength of 550 nm at 23° C.

3. The optical member according to claim 1,
   wherein the polarization converting layer comprises a light diffusing layer, and
   wherein the light diffusing layer has a haze value of from 80% to 99.9%.

4. The optical member according to claim 1,
   wherein the polarization converting layer comprises a λ/4 plate,
   wherein the λ/4 plate has an in-plane retardation Re(550) of from 80 nm to 200 nm, and
   wherein an angle formed between a slow axis of the λ/4 plate and a reflection axis of the reflective polarizer is from 30° to 60°.

5. The optical member according to claim 1, further comprising a low-refractive index layer integrated at one of a position between the reflective polarizer and the prism layer, and a position on an opposite side of the reflective polarizer to the prism layer, wherein the low-refractive index layer has a refractive index of 1.30 or less.

6. The optical member according to claim 1, wherein the reflective polarizer comprises a linearly polarized light separation-type reflective polarizer.

* * * * *